May 2, 1944.    M. A. LETHENSTROM    2,347,918
RECIPROCATING SAW MACHINE
Filed Oct. 30, 1942
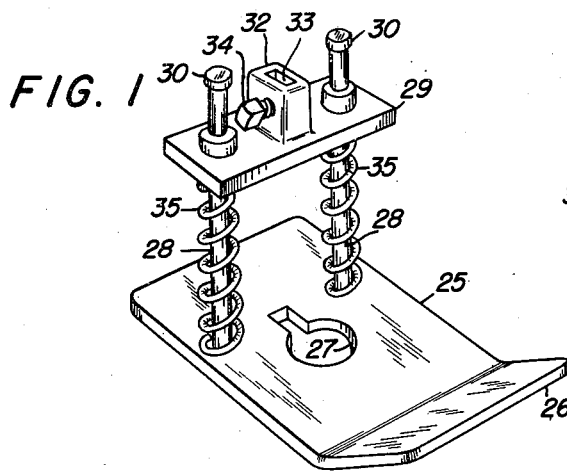
FIG. 1
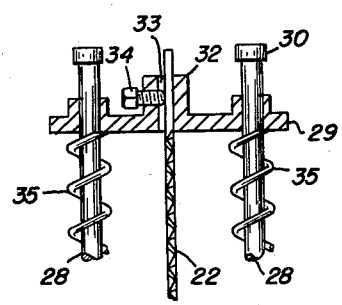
FIG. 5
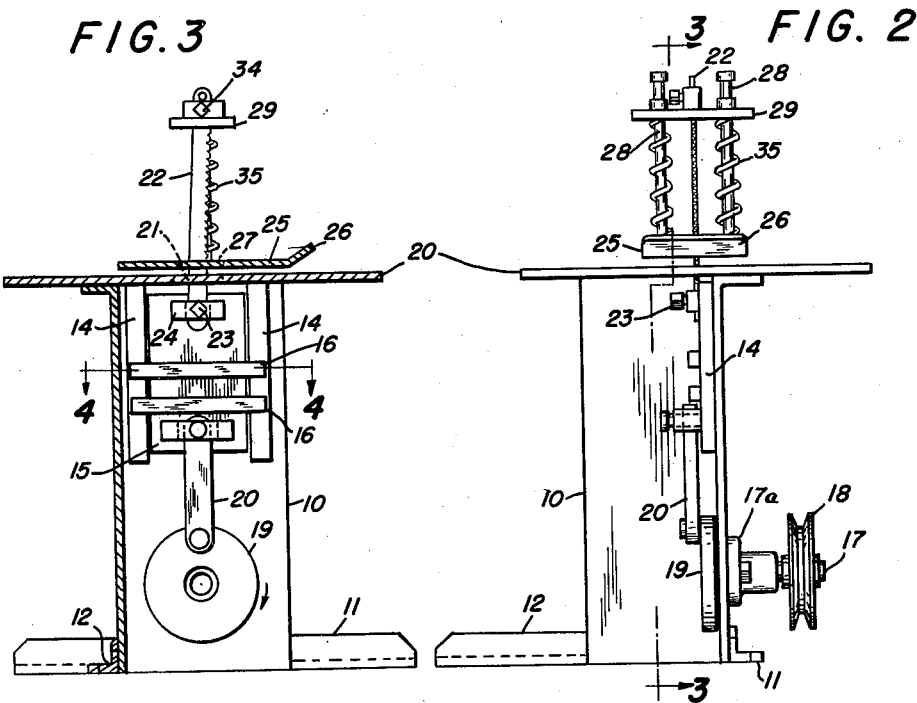
FIG. 3
FIG. 2
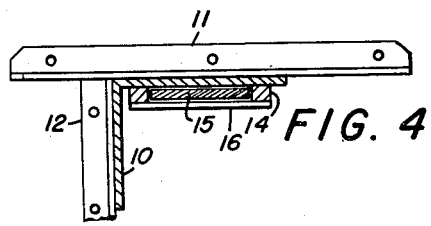
FIG. 4
MERVIN A. LETHENSTROM
INVENTOR
BY Smith & Tuck
ATTORNEYS Patented May 2, 1944

2,347,918

UNITED STATES PATENT OFFICE 2,347,918

RECIPROCATING SAW MACHINE

Mervin A. Lethenstrom, Seattle, Wash.

Application October 30, 1942, Serial No. 463,877

2 Claims. (Cl. 143—72)

My invention relates to reciprocating saw machines and more particularly to scroll saws of the type useful in cutting relatively thin sheet material of unlimited size.

According to previous practice, it has been usual, in cutting thin sheets of almost any material, to employ two general types of saws. One is the free-end or saber type saw, in which a blade is reciprocated vertically, with one end free usually for insertion through openings in the sheet wholly within the boundaries thereof. The ordinary alternative provision is a lateral arm disposed in opposition to the work table, and in which the saw is guided and, occasionally, returned by springs or pistons or the like. In the instance of the free-end saw, limitations upon the work that can be done result from the fact that the upper free blade end is unguided in its stroke. With regard to the saws in which the lateral arm is used the size of the throat between the arm and the table limits the size of the sheet that can be cut in such a machine.

Having in mind the defects of the prior art saw machines, it is an object of my invention to provide a reciprocating saw for cutting sheet material in which the size of the sheet that can be accommodated is wholly unrestricted.

Another object of my invention is to provide, in a saw of the type described, guide means for the cutting blade and to do so without restricting or limiting size of an intermediate opening that may be cut.

A still further and more specific object of my invention is the provision, in a saw mechanism of the type described, of presser means operable to hold sheet material upon the work surface around the cutting point, to do so without necessitating the use of a supporting arm or other supporting mechanism, and to guide the saw blade.

The foregoing objects and other ancillary thereto I prefer to accomplish as follows:

According to a preferred embodiment of my invention, I provide a base having suitable vertical guideways for receiving and guiding a reciprocal saw carrier member. Mounted also on the base is a rotary driven member that includes drive means therefor. A coupling link is secured to said rotary member eccentric of its axis of rotation and to the saw carrier, whereby the rotary motion is translated into a reciprocal movement of the carrier. I couple a saw blade to the carrier member and pass it upwardly through a work table supported upon the base so that work placed upon the table can be fed to the saw and cut thereby. In the case of those cuts that are to be made wholly within the boundary of the sheet material, it is usual to form a hole in the sheet and, in that instance, the saw blade is inserted through the hole so that the sheet may be brought down to the level of the work table, whereupon the cutting operation may be performed. To the saw blade I connect a work presser and saw-guide means which comprises a crosshead adapted for attachment to the upper end of the blade. Below the crosshead is a presser foot through which the blade passes and between the presser foot and the crosshead are guide rods and expansible members operable to press the foot downwardly on the work table. Thus, during a cutting operation, the sheet being cut is pressed firmly against the table. At the same time the blade is guided.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which Figure 1 is a perspective view of the presser member of my invention;

Figure 2 is a vertical elevational view of my reciprocating saw mechanism;

Figure 3 is a vertical sectional view taken on line 3—3 of Figure 2;

Figure 4 is a horizontal sectional view taken on line 4—4 of Figure 3; and

Figure 5 is an enlarged fragmentary detail view of the crosshead, saw blade, guide and resilient means employed in connection with the presser of Figure 1.

A reciprocating saw mechanism, to overcome the defects hereinbefore enumerated, must have at least two totally distinct characteristics; it must be capable of holding the work firmly during the cutting operation; and it must also be so arranged as to provide a suitable guide for the saw blade during its reciprocation. Accordingly, a preferred embodiment of my invention, referring to Figures 2 and 3 of the drawing, is constituted by a base 10 which is here shown to be L-shaped, and to have foot bars 11, 12 which broaden the base and also permit its attachment wherever the use of the machine is desired. Upon one of the faces of this base 10, ways 14 are mounted for guiding the saw carrier member 15 in its reciprocating movement.

A bearing 17a in the lower portion of the base provides a journal for shaft 17 which has on one end the pulley 18 and on the other the rotary member 19. A connecting link 20 is pivotally joined at its lower end to the rotary member 19 and at its upper end to the reciprocal carrier 15. Crossbars 16 between the guideway members 14 retain the carrier in position.

Resting on the upper portion of the base is the work table 20 which has a small opening or slot 21 through which is passed the saw blade 22. On its lower end the saw blade is joined or secured to the carrier 15 by the set screw 23 in the yoke 24.

Referring now to Figure 1, wherein is shown in perspective the presser member, it will be seen that the presser member comprises the foot plate 25 having the forward upturned nose 26 and an intermediate opening 27 for the accommodation of the saw blade. The presser opening is shaped to permit viewing guide lines or a line on the material as the cutting progresses. To either side of the opening, and rising above the plate 15, is a pair of guide rods 28 upon which is slidably mounted the crosshead 29. Caps 30 on the upper end of the guide rods 28 retain the crosshead thereon. Between the guide rods, the crosshead has an intermediate boss 32 which has a central opening 33. A set screw 34 passes through a boss wall and into the opening 33 to clamp a blade therein. As shown in Figures 3 and 5 the upper end of the saw blade 22 is inserted in the slot 33 of the crosshead and secured in place by tightening the set screw 34. The springs 35 on rods 28 tend to spread the foot 25 and the crosshead 29 and, when the saw is secured in place in slot 33, to impart tension upwardly of the blade 22 as well as downward upon the foot.

In operation my sawing mechanism works as follows: power may be applied to the shaft 17 through a belt passed around the sheave 18, whereupon the member 19 is rotated and, through the instrumentality of the link 20, the carrier 15 is reciprocated in a vertical plane. Lateral movement of the carrier is resisted by the guideways 14 and its displacement is prevented by the cross bars 16. Saw blade 22 coupled to the carrier in the manner previously described will be seen also to reciprocate vertically through an opening in the work table 20 above.

It will be noted in Figure 3 that the saw blade is shown as canted forward so that the upper end overhangs the lower end slightly. In other words, the saw blade is caused to travel in an angular path in its vertical reciprocation, so that a sawing cut is effected from the top of the stroke to the bottom without movement of the material being cut. Thus it can be seen that work clamped to the work table will be cut without forward movement during this downward stroke of the saw and that the cut will be measured by the length or overhang of the top of the blade with respect to the bottom portion.

The top of the saw blade is secured in the slot 33 to anchor it to the crosshead 29. Ordinarily, a slight tension is applied by anchoring the crosshead to the blade with the springs 35 slightly tensed. In this arrangement the presser foot 25 will rest upon the table with varying degrees of pressure. Work is fed under the presser foot, usually by inserting it under the upturned nose 26, in which instance a cut may be made in a piece of sheet material starting at one edge. As the carrier and saw blade descend through the action of the drive mechanism, the presser foot is wedged against the work with progressively increasing pressure to firmly clamp the work in position and to hold it while the saw teeth are performing their customary cutting action. This pressure is released as the saw blade returns upwardly. Upon being released sufficiently, the work may then be fed a greater degree to the blade for the next cut.

In those instances where it is desired to make a saw cut in sheet material and which cut is to be wholly within the boundaries of the sheet, the sheet is usually pierced or a hole is formed for the introduction of the saw blade. In that instance, the sheet is dropped over the upper end of the saw blade while the presser mechanism is removed. Then the crosshead is attached to the saw blade in the manner that has been described, and the cutting operating is performed as before.

It will be seen that an important advantage of this invention lies in the fact that the work is held upon a work table during the cutting and also that the upper end of the saw blade is guided by reason of the fact that the crosshead 29 slides upon the guide rods 28. Since the springs 35 serve to exert pressure against the presser foot, the foot and its guide rods are relatively rigid during the downward cutting stroke of the blade, and misalignment of the saw blade is thus to a great degree prevented. By this mechanism, as will readily be seen, it is possible to eliminate an overhead supporting structure such as an arm or other suspension means which would limit the size of the sheet that can be accommodated by my reciprocating saw machine.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In a reciprocating saw mechanism of the type wherein a saw blade having an upper free end is reciprocated vertically through a work table from below, the combination comprising: a member for non-movable attachment to such saw blade, a work presser foot below said member and adapted to press to said table work presented to the saw blade about the cutting point thereof, and resilient extensor means between said member and said foot to press the latter against the work during cutting and to tension the saw blade.

2. In a reciprocating saw mechanism of the type wherein a saw blade having an upper free end is reciprocated vertically through a work table from below, the combination comprising: a crosshead for attachment to an upper portion of the saw blade and including guideways, a presser member below said crosshead and adapted to press to said table work presented to the saw about the cutting point thereof, guide bars on said presser member extend along the side of the saw blade and having sliding engagement in the guide ways of the crosshead, and spring means between said crosshead and said presser member to press the latter against the work during cutting and to tension the saw blade.

MERVIN A. LETHENSTROM.